United States Patent [19]

Fischler

[11] Patent Number: 5,609,037
[45] Date of Patent: Mar. 11, 1997

[54] SELF-CONTAINED VEHICLE REFRIGERATION UNIT

[76] Inventor: Richard Fischler, 168-01 12th Ave., Apt. 7A, Whitestone, N.Y. 11357

[21] Appl. No.: 340,060

[22] Filed: Nov. 15, 1994

[51] Int. Cl.[6] .................................................. B60H 1/32
[52] U.S. Cl. ........................................... 62/239; 62/323.1
[58] Field of Search ............................. 62/323.1, 323.3, 62/323.4, 239; 474/150

[56] References Cited

U.S. PATENT DOCUMENTS

| | | | |
|---|---|---|---|
| 4,015,182 | 3/1977 | Erdman | 318/334 |
| 4,169,360 | 10/1979 | Shimizu | 62/323 |
| 4,172,367 | 10/1979 | McCusker | 64/4 |
| 4,217,764 | 8/1980 | Armbruster | 62/323 |
| 4,394,818 | 7/1983 | Brownfield et al. | 62/239 |
| 4,551,986 | 11/1985 | Anderson et al. | 62/239 |
| 4,736,597 | 4/1988 | Anderson et al. | 62/239 |
| 4,787,214 | 11/1988 | Stillwell | 62/228.4 |
| 4,811,569 | 3/1989 | Welch et al. | 62/239 |
| 4,856,291 | 8/1989 | Takahashi | 62/217 |
| 5,046,326 | 9/1991 | Havemann et al. | 62/180 |
| 5,048,302 | 9/1991 | Hagenlocher et al. | 62/228.4 |
| 5,222,373 | 6/1993 | Waldschmidt | 62/239 |

Primary Examiner—William E. Tapolcai
Attorney, Agent, or Firm—Graham & James LLP

[57] ABSTRACT

A self-contained vehicle refrigeration unit including a refrigeration unit housing, a refrigeration unit drive system having a driving device that is separate from a driving device for a vehicle on which the refrigeration unit is mounted, an evaporator section and a condensing section. The drive system, the evaporator section and the condensing section are mounted within the unit housing so that none of the components of the vehicle refrigeration unit protrudes into a payload or cargo space of a vehicle body.

27 Claims, 3 Drawing Sheets

SELF-CONTAINED VEHICLE REFRIGERATION UNIT

BACKGROUND OF THE INVENTION

The present invention relates to a self-contained vehicle refrigeration unit, and more particularly, to a self-contained vehicle refrigeration unit having a relatively compact construction and an evaporator section located in the same housing as a vehicle refrigeration unit drive system so that the evaporator section does not protrude into a payload space or cargo space of a vehicle body.

Conventional vehicle refrigeration units typically include a refrigeration unit drive system mounted within a unit housing attached to a vehicle body above a vehicle cab. The conventional refrigeration unit drive systems have a driving motor connected to at least one driven component via several belts and a plurality of pulleys mounted on the driven component and the driving motor. Because a plurality of pulleys and belts are used, the refrigeration unit drive system occupies a relatively large amount of space in the refrigeration unit housing. This relatively large space requirement prevents all of the components of the vehicle refrigeration unit from being mounted on the outside of the vehicle body and within the unit housing.

As a result, the evaporator section of conventional vehicle refrigeration units must be mounted within a vehicle body thereby reducing the amount of payload or cargo space of the vehicle body. This is disadvantageous because of the wasted payload space and because the components of the evaporator section increase the difficulty of loading of the vehicle body because the evaporator section inside of the vehicle body must be avoided. In fact, people loading objects in the vehicle body often strike their heads and/or shoulder on the components of the evaporator section.

Furthermore, the conventional vehicle refrigeration units are not easily accessible for maintenance and repair. Because the evaporator section is located within the vehicle body and the remaining elements of the refrigeration unit are located in the unit housing, a repair person may have to gain access to both the vehicle body and the refrigeration unit housing to complete a maintenance or repair operation. In some cases, a repair may require that one repair person work in the unit housing while another person works in the vehicle body, thereby increasing the amount of time and expense of repairing or maintaining the refrigeration unit.

One conventional refrigeration unit has overcome the problem with the evaporator section protruding into the payload space of the vehicle body. Welch, U.S. Pat. No. 4,811,569, teaches a transport refrigeration unit in which an evaporator 150 is located in the same housing as the other refrigeration unit components so that an evaporator blower does not protrude into the payload space of the vehicle body.

However, the drive system of this refrigeration unit is complicated and requires a plurality of pulleys and drive belts. This increases the time and difficulty involved in assembling the refrigeration unit, as well as, making it more difficult to service the unit. Also, both the evaporator blower 122 and the condenser fan 120 are driven by a main drive shaft 116 which extends along the length of the refrigeration unit housing thereby increasing the space requirements of the drive system. Also, if one of the driven components driven by the main drive shaft 116 seizes suddenly, the drive shaft 116 may be damaged by the extreme torque created by the stoppage of the seized drive component. Then, the drive shaft 116 would have to be replaced which is difficult and expensive. Also, because of the nature of the drive system, air from the condenser 170 must be directed from one side of the unit, along the entire length of the drive system and out an opposite side of the unit as seen in FIG. 5.

SUMMARY OF THE INVENTION

Thus, there exists a need for a more compact vehicle refrigeration unit having a simple drive system and that is mounted within a single housing so as to not protrude into a payload or cargo space of a vehicle body.

It is an object of the present invention to provide a vehicle refrigeration unit that overcomes the disadvantages of conventional vehicle refrigeration units discussed above.

It is a further object of the present invention to provide a self-contained vehicle refrigeration unit that is more compact than conventional vehicle refrigeration units.

Another object is to provide a self-contained vehicle refrigeration unit having a simple drive system and an evaporator section that does not protrude into a payload or cargo space of a vehicle body.

It is a further object of the present invention to provide a vehicle refrigeration unit that includes a condenser section, an evaporator section and a refrigeration unit drive system all mounted within the same housing.

A preferred embodiment of the present invention provides a self-contained vehicle refrigeration unit including a refrigeration unit housing, a refrigeration unit drive system having a driving device that is separate from a driving device for a vehicle on which the refrigeration unit is mounted, an evaporator section and a condensing section, wherein the drive system, the evaporator section and the condensing section are mounted within the unit housing.

The refrigeration unit drive system preferably comprises a drive system as described in U.S. patent application Ser. No. 08/340,281, entitled "DRIVE SYSTEM HAVING MULTI-DRIVE PLATE," filed in the name of Richard Fischler and James McCusker on Nov. 15, 1994. The disclosure of U.S. patent application Ser. No. 08/340,281 is incorporated herein by reference.

The driving device for the vehicle refrigeration unit may preferably comprise a diesel engine, a gasoline engine, a natural gas powered engine, an electric motor or other suitable driving device. The driving device is preferably separate from the driving device or engine for a vehicle on which the refrigeration unit is mounted. The driving device for the vehicle refrigeration unit is mounted in the unit housing.

The driving device may preferably be connected to and drive an alternator and a fan for a radiator. The fan is preferably connected to the drive shaft of the driving device at an end of the driving device that is opposite to the end of the drive shaft of the driving device that drives the driven components. The alternator may either be located at the same end as the fan and driven by a belt or may be located at the same end as the other driven components and be driven by the same belt that drives the other driven components.

In addition, an auxiliary driving device may be provided for various uses such as a standby or back-up power source to be used when the main driving device is not operating and for other functions. It is preferred that the auxiliary driving device comprises an electric motor that is powered by a standard AC power source, such as a 220 Volt power source. The auxiliary driving device can be provided with a plug for connecting the auxiliary driving device with the standard power source. Also, a voltage transformer is preferably provided and connected to the external AC power source for converting AC power from the AC power source to a DC voltage for supplying DC power to a condenser fan and an evaporator blower and other components such as a thermostat, temperature gauge, and other suitable components.

The evaporator section preferably comprises an evaporator coil and an evaporator blower. The evaporator blower may comprise a plurality of fans which are driven by an electric motor provided within the evaporator blower. The electric motor is preferably supplied with power by the alternator driven by the main driving device. If an auxiliary driving device is driving the drive system, a voltage transformer provides DC power to the refrigeration unit to drive the evaporator blower and the condensing fan, as well as, other components including a thermostat and temperature gauge.

The condensing section preferably comprises a condenser unit and at least one condenser fan. The condenser fan is preferably provided with a separate electric motor which can be driven by either the alternator or the power supplied from the voltage transformer.

The drive system described in U.S. patent application Ser. No. 08/340,281, can be adapted for the vehicle refrigeration unit of the present invention. Such a drive system requires fewer parts, weighs less, is easier to assemble and service and requires less space than conventional drive systems. The weight and space requirements of the inventive drive system are substantially reduced because only one drive belt is required and the plurality of mounting members and vibration dampening devices required in conventional drive systems are unnecessary. Therefore, the weight and space requirements of the refrigeration unit are also reduced.

With this savings in space and weight, several advantages can be achieved in forming complete units such as a self-contained vehicle refrigeration unit. For example, because the refrigeration unit drive system is relatively compact, there is more room in the unit housing. So instead of an evaporator blower for blowing the refrigerated air into a vehicle body being mounted in the vehicle body thereby unnecessarily taking up valuable payload or cargo space in the vehicle body, an evaporator blower of the evaporator section in the present invention can be mounted completely within the unit housing without protruding into the payload or cargo space of the vehicle body. Thus, an evaporator section, a condensing section and the refrigeration unit drive system can all be mounted within the unit housing. Also, the vehicle body including a trailer compartment and a cab compartment can be left undisturbed and the entire payload space of the vehicle body can be used. This allows for easier access and maintenance of the vehicle refrigeration unit.

Further, because the evaporator section and condensing section are driven by driving devices that are separate from the drive system, the drive system is more compact and does not extend throughout the entire refrigeration unit housing. Therefore, the condensing section and the evaporator section can be mounted relatively close to each other without being separated by a drive components for driving the evaporator and condenser. This adds to the compact nature of the refrigeration unit.

DETAILED DESCRIPTION OF PREFERRED EMBODIMENTS

Figure 1:
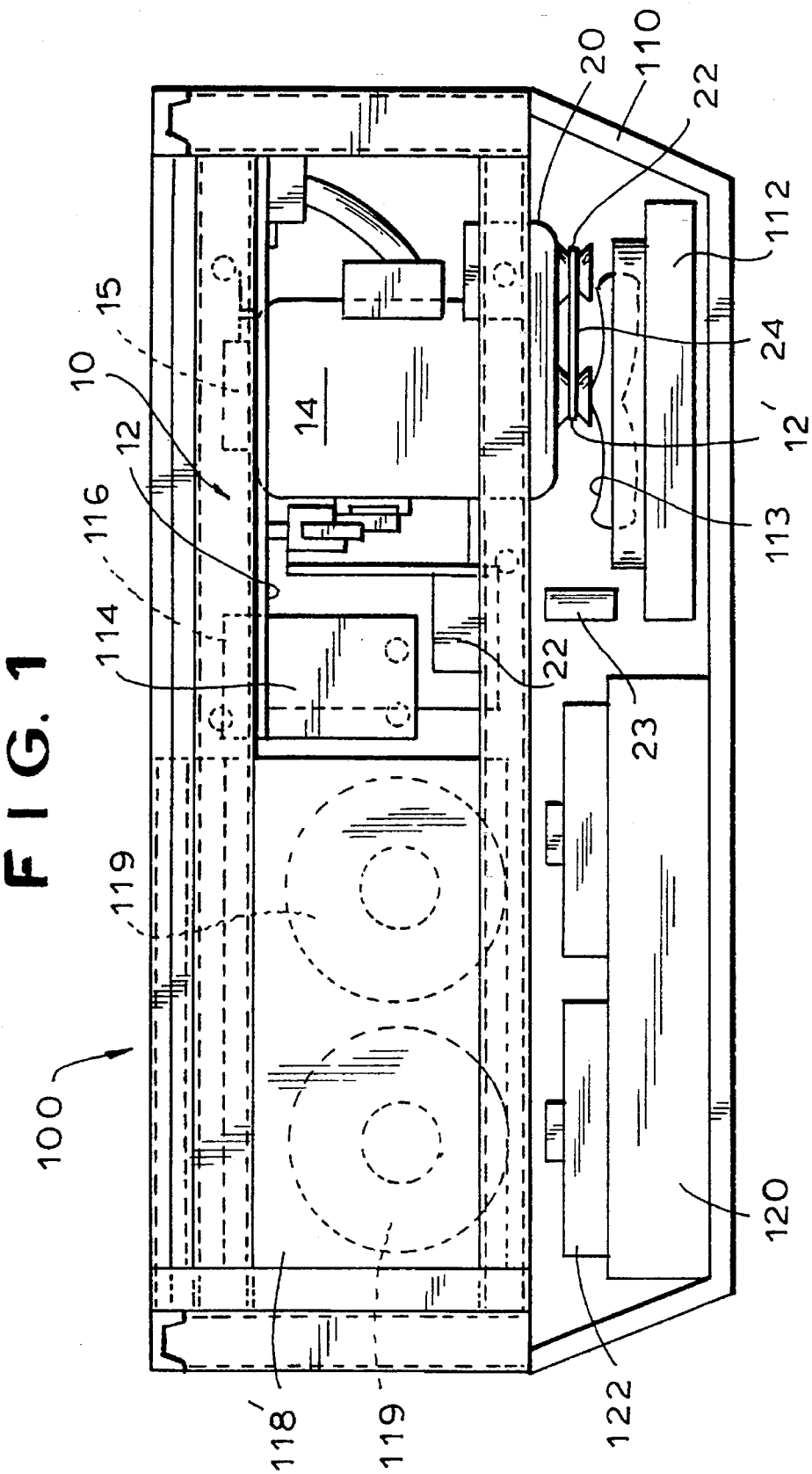
FIG. 1 is a top view of a self-contained vehicle refrigeration unit according to a preferred embodiment of the present invention.
Figure 2:
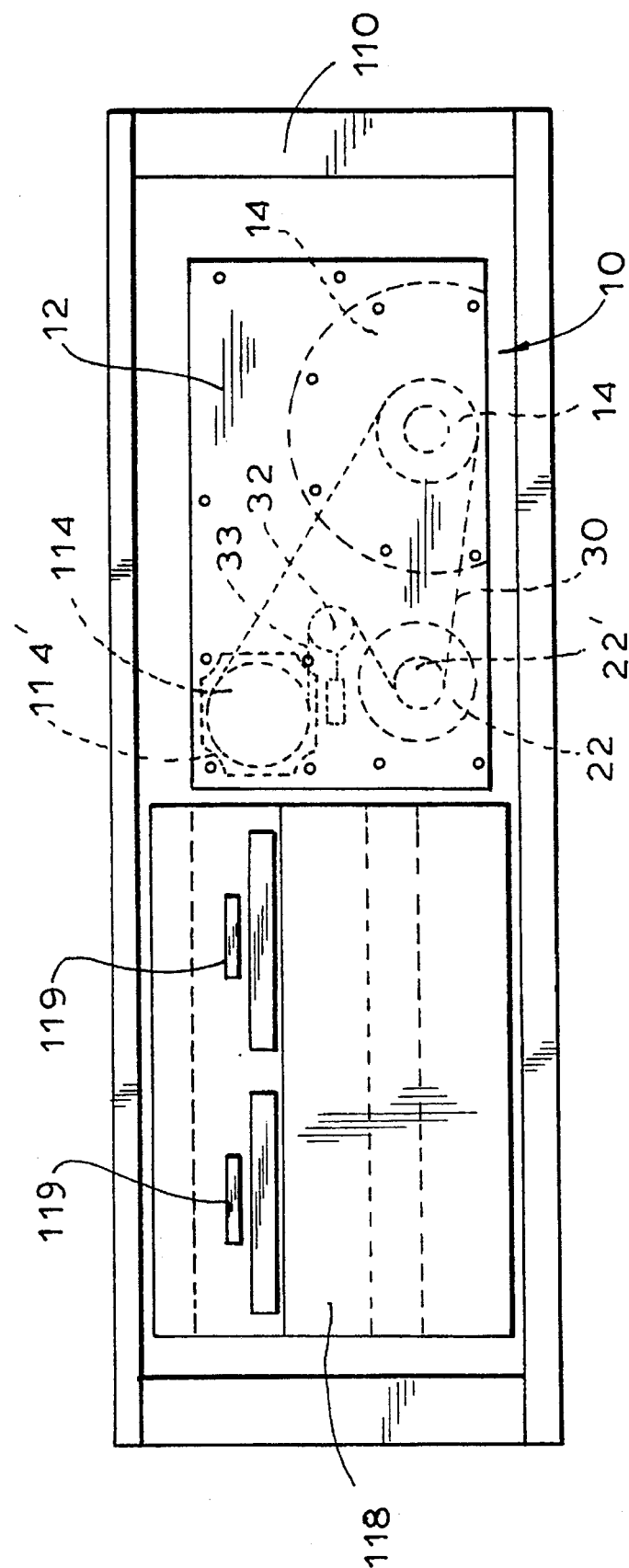
FIG. 2 is a front view of the self-contained vehicle refrigeration unit shown in FIG. 1 with the condenser omitted for clarity.
Figure 3:
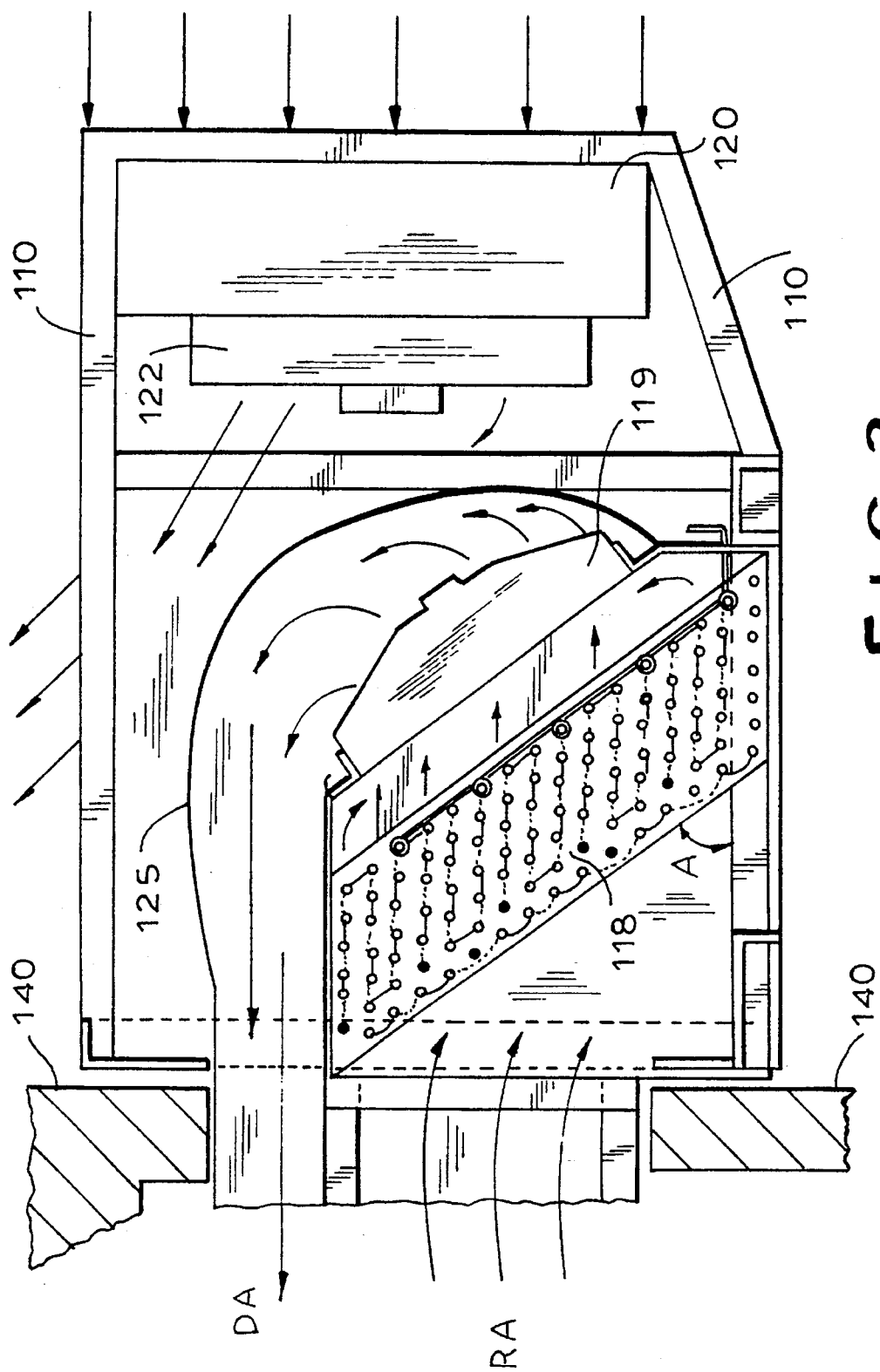
FIG. 3 is a side view of the self-contained vehicle refrigeration unit shown in FIG. 1 with a main driving device omitted for clarity.

A preferred embodiment of a vehicle refrigeration unit 100 is shown in FIGS. 1–3. The vehicle refrigeration unit is provided in a unit housing or frame 110.

A refrigeration drive system 10 is provided in the housing 110. The drive system 10 preferably comprises the drive system described in U.S. patent application Ser. No. 08/340,281, The drive system 10 includes a machined multi-drive plate 12 for mounting a plurality of driving members and driven members. The multi-drive plate 12 containing the driving and driven members is installed as a unitary drive system in a frame for a unit such as a self-contained vehicle refrigeration unit. A vibration dampening member (not shown), such as rubber cushions, may be provided between the multi-drive plate 12 and the unit frame 110 to prevent vibration from being transmitted from the multi-drive plate 12 to the unit frame 110.

The drive system 10 includes a main driving device 14 in the form of an engine powered by diesel fuel, gasoline, natural gas or electricity, etc. mounted on the multi-drive plate 12. The drive system 10 may also include an auxiliary driving device 22 in the form of an electric motor, for example. The drive system also includes at least one driven component 114 comprising at least one of a compressor, fan, generator, alternator, hydraulic pump, water pump, and other suitable driven devices. It is preferable that the drive system 10 has a plurality of driven components 114 mounted on the multi-drive plate and driven by the drive system 10.

The driven member 114 shown in FIG. 1 is a compressor for the vehicle refrigeration unit 100. The compressor has a pulley 114' mounted on a shaft that extends from the compressor 114 through the multi-drive plate 12. The compressor 114 also includes a clutch 116 for engaging and disengaging the compressor with the rest of the drive system 10 to control temperature and as a safety device when a compressor pressure falls outside of an acceptable range. The clutch 116 is preferably an electromagnetic clutch that can be activated at any time to engage or disengage the compressor pulley 114' with the drive system 10 for controlling temperature, as a safety device and as desired for other reasons. For example, activation of the compressor 114 may be delayed by a suitable controller until the main driving device 14 has reached a predetermined speed.

A plurality of other driven components can also be mounted on the multi-drive plate 12 as required and in a manner similar to the mounting of the compressor 114. Each of the plurality of driven components and driving members have attached pulleys for being driven by and driving, respectively, a single drive belt 30 shown in FIG. 2.

A drive pulley 14' for the main driving device 14, a drive pulley 22' for the auxiliary driving device 22 and a drive pulley 114' for the compressor 114 are shown in FIG. 2. The drive pulleys 14', 22' and 114' are mounted on the multi-drive plate 12 in such a way that allows the pulleys 14', 22' and 114' to be precisely aligned with each other so as to be driven by the single drive belt 30. The size of each of the drive pulleys can be selected so that the main driving device 14 and auxiliary driving device 22 can be operated at an optimum speed while accommodating a required speed of a driven component, such as a generator to be operated at 1800 r.p.m. or 3600 r.p.m. while the main driving device is allowed to operate at an optimum speed of 2400 r.p.m., for example.

Each of the main driving device 14, the auxiliary driving device 22 and the plurality of driven members 114 are located on one side of the multi-drive plate 12 as seen in FIG. 1. A drive shaft for each of the above devices extends from the other side of the multi-drive plate 12 (the lower side in FIG. 1) where the main driving device 14, the auxiliary driving device 22 and the compressor 114 are located through the multi-drive plate 12 to the drive pulleys 14', 22' and 114' located on the other side of the plate 12 (the upper side shown in FIG. 1).

Each of the drive pulleys 14', 22' and 114' are engaged by a single drive belt 30 shown in FIG. 2 which is driven by either the main driving device 14 or the auxiliary driving device 22 to drive each of the plurality of driven devices. The belt 30 is arranged on the pulleys of the main and auxiliary driving devices and each of the plurality of driven devices in a serpentine manner which allows the plurality of driven devices to be driven by a single belt. The mounting of the main driving device 14, the auxiliary driving device 22 and the compressor 114 on the multi-drive plate 12 allows the pulleys 14', 22' and 114' to be easily and accurately aligned relative to each other so that the belt 30 can rotate on the pulleys in a single plane without lateral movement of the belt 30 between pulleys.

The drive system also includes at least one tension pulley 32 for maintaining tension in the driving belt 30. The tension pulley 32 is preferably spring-loaded by a spring 33 to a tensioning position to maintain a desired tensioning force in the belt 30. Because the tension pulley 32 is spring-loaded and maintains the desired tension force in the belt 30, adjustment of the belt tension is unnecessary. The spring loading of the tension pulley is such that the tension pulley 32 can be moved in the direction of arrow A from a tensioning to a non-tensioning position to allow for easy replacement of the belt. More specifically, a manual force can be applied to tension pulley 32 in a direction opposite to the biasing direction of the spring 33 to move the tension pulley 32 to a non-tensioning position. The belt 30 can then be removed from the drive system and a new belt can be mounted thereon in a matter of seconds. The tension pulley 32 is then moved to a tensioning position by removing the manual force and allowing the spring 33 to bias the tension pulley 32.

The main driving device 12 may preferably have a pulley 12' which can be connected to a pulley 22 of an alternator 20 via a belt 24. Alternatively, the alternator 20 may be provided on the multi-drive plate 12 in a manner similar to the other driven components 114. The alternator 20 can be used to supply DC power to an evaporator blower and a condenser fan to be described in the following paragraphs.

The main driving device 12 may also be connected to a fan 113 for a radiator 112. The fan 113 can be directly connected to one end of a drive shaft of the driving device 112.

The auxiliary driving device 22 preferably comprises an electric motor. The pulley 22' for the auxiliary drive device 22 is mounted on a shaft that extends from the auxiliary drive device 22 through the multi-drive plate 12. If the drive system is provided with an auxiliary drive device 22, a clutch 15 is preferably mounted on the shaft of the main driving device 14. The clutch 15 may comprise a mechanical centrifugal clutch or an electromagnetic clutch. An electromagnetic clutch is preferred.

The components of such an electromagnetic clutch 15 are described in U.S. patent application Ser. No. 08/340,281. The details of the clutch will not be repeated herein for the sake of brevity.

A voltage transformer 23 is preferably provided for converting input AC power to a DC voltage for supplying power to an evaporator blower and a condenser fan to be described in the following paragraphs. The voltage transformer 23 can also supply power to a thermostat, a temperature gauge and other suitable components. The voltage transformer 23 receives input AC power from the external power source and supplies output DC power when the auxiliary driving device 22 is driving the drive system 10.

If an auxiliary driving device 22 is not provided in the drive assembly, the clutch 15 is unnecessary and can be omitted. A drive pulley can be provided in place of the clutch 15 and attached to the main driving device 14 so that the drive pulley is rotated when the main driving device 14 is operating. In addition, if the drive system is formed without an auxiliary driving device 22, a dummy pulley can located in its place so that the auxiliary driving device can be added at a later date. Also, the clutch 15 can be easily mounted onto the drive shaft of the main driving device 14 if an auxiliary driving device is added.

With the above described drive system, a substantial savings in space required for a power plant is achieved. This leads to installations which can be miniaturized and allows for other components of an installation to be housed within a unit housing.

According to the preferred embodiment of the invention, the vehicle refrigeration unit 100 includes the radiator 112, the radiator fan 113, the main driving device 12, the alternator 20, the auxiliary driving device 14, the clutch 15 mounted on the drive shaft of the main driving device 12, a compressor 114 including a clutch 116 mounted thereon, an evaporator section having an evaporator coil 118 and at least one evaporator blower 119 and a condensing section having a condenser unit 120 and at least one condenser fan 122.

In the preferred embodiment shown in FIGS. 1–3, two condensing fans 122 and two evaporator blowers 119 are shown. However, one or more condensing fans and evaporator blowers may be used, as needed.

Each of the pair of condensing fans 122 and the evaporator blowers 119 may have an internal power device such as an electric motor (not shown). The electric motors are electrically connected to the alternator 20 for receiving DC voltage. The electric motors of the condensing fans and the evaporator blowers may also be electrically connected to the voltage transformer 23 which receives AC power from the external AC power source and converts the AC power to DC voltage for driving the evaporator blowers and condensing fans.

Because the drive system 10 is so compact and requires a relatively small amount of space, the drive system 10 can be mounted within the frame 110 with the evaporator coil 118, the evaporator blowers 119, the condenser 120 and the condenser fans 122. Also, the compactness of the drive system allows for the evaporator coil 118 and evaporator blowers 119 to be mounted so as to not protrude into the cargo or payload space in a vehicle body as seen in FIG. 3. The provision of separate electric motors in each of the evaporator blowers 119 and the condensing fans 122 allows the evaporator section and the condensing section to be located relatively close to each other to increase the compactness of the refrigeration unit.

The evaporator blowers 119 are mounted within the frame 110 and outside of the vehicle body 140 so that discharge air DA is transmitted from the blowers 119 through an opening in the frame 110 and expelled into the vehicle body. The discharge air DA is guided by an air flow guide 125 so that the air exits into the vehicle body. The return air RA is received through another opening in the vehicle body and frame 110 and into the evaporator coil 118.

The evaporator coil 118 is positioned within the frame 110 at an angle A of about 25 to 90 degrees relative to a bottom surface of the frame 110. Preferably, the evaporator blowers 119 are arranged to be substantially parallel to the evaporator coil 118 to improve air flow through the evaporator section. Also, to improve air flow, the evaporator blowers 119 preferably have means for redirecting the input air flow by about a 90 degree turn so that the air flow to the opening in the vehicle body is increased as shown in FIG. 3.

The condensing section receives air from an opening in the front of the unit frame 110 and outputs the air from the condensing fans 122. Because the frame 110 is open on the top portion thereof, the air from the condensing fans 122 can exit through the top of the frame 110 as shown in FIG. 3.

Although the preferred embodiment has been described with reference to a vehicle refrigeration unit, several alternative installations are contemplated. Other installations, such as an air conditioning unit for a building, stand-alone power plants used in marine and remote area environments, and other suitable systems, can be miniaturized and arranged so that a plurality of components forming the installation are housed within a single unit.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vehicle refrigeration unit comprising:
    a refrigeration unit housing comprising a substantially rectangular body having a pair of longer sides and a pair of shorter sides each connected to a respective one of the longer sides, the refrigeration unit housing having a first half and a second half being separated by an imaginary line extending parallel to the shorter sides and perpendicular to the longer sides of the refrigeration unit housing;
    a drive system for driving at least one driven component, the drive system including a driving pulley and a drive shaft;
    an evaporator section; and
    a condensing section; wherein
        the evaporator section and the condensing section are each located completely within only the second half of the refrigeration unit housing and the drive system, including the drive pulley and the drive shaft, is located completely within only the first half of the refrigeration unit housing.

2. The vehicle refrigeration unit of claim 1, wherein the drive system comprises a driving device that is separate from a driving device for a vehicle on which the refrigeration unit is mounted.

3. The vehicle refrigeration unit of claim 1, wherein the at least one driven device comprises a compressor for being driven by the drive system.

4. The vehicle refrigeration unit of claim 1, wherein the condensing section comprises a condenser unit and at least one condenser fan and the evaporator section comprises an evaporator coil and at least one evaporator blower.

5. The vehicle refrigeration unit of claim 4, wherein the at least one evaporator blower is located entirely within the unit housing so as to not protrude into a vehicle body.

6. The vehicle refrigeration unit of claim 4, wherein the evaporator coil is disposed at an angle of about 25 to 90 degrees relative to a bottom section of the unit housing.

7. The vehicle refrigeration unit of claim 6, wherein the evaporator coil and the at least one evaporator blower are substantially parallel.

8. The vehicle refrigeration unit of claim 4, wherein the at least one evaporator blower comprises means for redirecting input air flow by about a 90 degree turn.

9. The vehicle refrigeration unit of claim 4, wherein the at least one condenser fan and the at least one evaporator blower each comprise an internal driving device which receives power by the drive system.

10. The vehicle refrigeration unit of claim 9, wherein the internal driving device in each of the at least one condenser fan and the at least one evaporator comprises an electric motor which DC voltage from the drive system.

11. The vehicle refrigeration unit of claim 4, wherein the at least one condenser fan and the at least one evaporator blower are not directly driven by the drive system.

12. The vehicle refrigeration unit of claim 4, wherein the drive system comprises
    at least one driving device;
    at least one driven component driven by the at least one driving device;
    a single belt operatively connected to the at least one driving device and the at least one driven member so that the belt is driven by the at least one driving device to drive the at least one driven component; and
    a support member supporting the at least one driving device, the at least one driven member, and the single belt so that the single belt is located on a first side of the support member and the at least one driving device and the at least one driven device are located on a second side of the support member.

13. The vehicle refrigeration unit of claim 12, further comprising a plurality of driven components mounted on the support member, wherein the support member comprises a machined plate.

14. The vehicle refrigeration unit of claim 13, wherein each of the at least one driving device and the plurality of driven components have a drive shaft and a driving pulley connected thereto, the driving pulleys being located on the first side of the multi-drive plate.

15. The vehicle refrigeration unit of claim 13, wherein the at least one driving device and the plurality of driven components are securely mounted on the support member to form an integral unit and so that the pulleys of each of the at least one driving device and the plurality of driven components are aligned relative to each other.

16. The vehicle refrigeration unit of claim 12, wherein the at least one driving device comprises one of a diesel engine, an electric motor, a gasoline engine, and a natural gas powered engine.

17. The vehicle refrigeration unit of claim 12, wherein the at least one driving device comprises a main driving device, the drive system further comprising an auxiliary driving device for driving the at least one driven component when the main driving device is not driving the at least one driven component.

18. The vehicle refrigeration unit of claim 17, wherein the auxiliary driving device comprises an electric motor.

19. The vehicle refrigeration unit of claim 12, further comprising at least one tension pulley for maintaining a desired tension in the single belt.

20. The vehicle refrigeration unit of claim 19, further comprising a spring for biasing the at least one tension pulley into a tensioning position.

21. The vehicle refrigeration unit of claim 12, wherein the single belt is disposed in a serpentine arrangement on the at least one driving device, the at least one driven member and the at least one tension pulley.

22. The vehicle refrigeration unit of claim 12, further comprising an alternator driven by the at least one driving device.

23. The vehicle refrigeration unit of claim 22, wherein the at least one driving device is connected at a first end to the single belt and at a second end to the alternator.

24. The vehicle refrigeration unit of claim 22, wherein the evaporator section includes at least one evaporator blower and the condensing section includes at least one condenser fan, the alternator is operatively connected to the at least one evaporator blower and the at least one condenser fan for supplying power thereto.

25. A vehicle refrigeration unit for being mounted on a vehicle body, the vehicle refrigeration unit comprising:

a refrigeration unit housing comprising a substantially rectangular body having a pair of longer sides and a pair of shorter sides each connected to a respective one of the longer sides, the refrigeration unit housing having a first half and a second half being separated by an imaginary line extending parallel to the shorter sides and perpendicular to the longer sides of the refrigeration unit housing, the housing having a rear portion located adjacent the vehicle body and a front portion located spaced from a vehicle body;

a drive system for driving at least one driven component;

an evaporator section; and a condensing section; wherein the drive system, the evaporator section and the condensing section are each located within the refrigeration unit housing, the drive system is located to extend from the rear portion to the front portion of the refrigeration unit housing and is contained within only the first half of the refrigeration unit housing, the condensing section and the evaporator section are located only in the second half of the refrigeration unit housing to be spaced from the drive system, the condensing section is located in the front portion of the refrigerator unit housing and the evaporator section is located in the rear portion of the refrigeration unit housing directly behind the condensing section.

26. A vehicle refrigeration unit comprising:

a refrigeration unit housing;

a drive system for driving at least one driven component;

an evaporator section including an evaporator blower; and a condensing section including a condenser fan; wherein the drive system, the evaporator section and the condensing section are each located within the refrigeration unit housing and the drive system is mechanically independent of the evaporator blower and the condenser fan.

27. The vehicle refrigeration unit of claim 26, wherein the refrigeration unit housing comprises a substantially rectangular body having a pair of longer sides and a pair of shorter sides each connected to a respective one of the longer sides, the refrigeration unit housing having a first half and a second half being separated by an imaginary line extending parallel to the shorter sides and perpendicular to the longer sides of the refrigeration unit housing, the drive system is located completely within only the first half of the refrigeration unit housing and the condensing section and the evaporator section are located completely within only the second half of the refrigeration unit housing so as to be separate spaced from the drive system.

* * * * *